United States Patent [19]
Grober et al.

[11] Patent Number: 5,473,157
[45] Date of Patent: Dec. 5, 1995

[54] VARIABLE TEMPERATURE NEAR-FIELD OPTICAL MICROSCOPE

[75] Inventors: Robert D. Grober, Califon; Timothy D. Harris, Toms River, both of N.J.

[73] Assignee: AT&T Corp., Murray Hill, N.J.

[21] Appl. No.: 215,535

[22] Filed: Mar. 22, 1994

[51] Int. Cl.$^6$ ............................................. H01J 37/252
[52] U.S. Cl. ........................................ 250/234; 250/306
[58] Field of Search .................................. 250/234, 306, 250/307, 309–311; 73/105

[56] References Cited

U.S. PATENT DOCUMENTS

| | | | |
|---|---|---|---|
| Re. 33,193 | 4/1990 | Yamaguchi et al. | 250/309 |
| 4,929,831 | 5/1990 | Flesner et al. | 250/307 |

OTHER PUBLICATIONS

Betzig, E., et al. "Combined shear force and near–field scanning optical microscopy", *Appl. Phys. Lett.*, 60 (20), pp. 2484–2486 (May 18, 1992).

Taubenblatt, M. A., "Lateral forces and topograhy using scanning tunneling microscopy with optical sensing of the tip position", *Appl. Phys. Lett.*, 54(9), pp. 801–803 (Feb. 27, 1989).

Kirk, M. D., et al. "Low–temperature atomic force microscopy", *Rev. Sci. Instrum.*, 59 (6), pp. 833–835 (Jun. 1988).

Betzig, E., et al. "Breaking the Diffraction Barrier: Optical Microscopy on a Nanometric Scale", *Science*, 251, pp. 1468–1470 (Mar. 22, 1991).

Betzig, E., et al. "Near–Field Optics: Microscopy, Spectroscopy, and Surface Modification Beyond the Diffraction Limit", *Science*, 257, pp. 189–195 (Jul. 10, 1992).

Albrecht, T. R., et al. "Low–temperature force microscope with all–fiber interferometer", *Ultramicroscopy*, 42 (44), pp. 1638–1646 (1992).

*Primary Examiner*—Stephone B. Allen
*Attorney, Agent, or Firm*—Richard J. Botos

[57] ABSTRACT

An apparatus for optically imaging surfaces at low temperature is disclosed. The apparatus places a probe within the near-field distance of a sample. Both the sample and probe are placed in a low-temperature environment. The probe and sample are movable relative to each other to enable the entire surface of the sample to be imaged. The probe dithers with a certain amplitude and is positioned within the near-field distance by observing the change in the dither amplitude as the probe is placed in proximity to the sample surface. The sample is imaged by spectroscopically evaluating the light emitted from the surface of the sample. The low temperature environment is provided by a cryostat which is adapted to receive the sample and probe. The cryostat enables the sample to be imaged at temperatures as low as 1.5 K., thereby reducing some of the light loss associated with spectroscopic imaging techniques.

13 Claims, 3 Drawing Sheets

VARIABLE TEMPERATURE NEAR-FIELD OPTICAL MICROSCOPE

BACKGROUND OF THE INVENTION

1. Field of the Invention

The invention relates to the field of scanning microscopes, and more particularly to those microscopes that employ a fine probe which senses shear forces close to the surface of the object being scanned.

2. Art Background

Near-field spectroscopy is a very promising technique for imaging semiconductors. In the context of imaging, near-field means that spatial resolution is less than $\lambda/2$. Diffraction limited imaging, by contrast, provides spatial resolution that is greater than $\lambda/2$. In near-field imaging, light is transmitted through an imaging probe to the surface. The probe-sample separation distance is less than the requisite spatial resolution. The light reflected from the surface is scanned by the probe and transmitted back to a detector. The probe oscillates in a plane substantially parallel to the surface of the scanned sample. A photodetector and an optical imaging means are used to detect changes in the oscillation of the probe tip. The change in probe tip oscillation is used to analyze the topography of the sample surface.

Semiconductors are spectroscopically imaged using techniques such as luminescence, reflectance, absorption, transmission, photoconductivity, and Raman scattering. In these techniques, an image of a surface is obtained by analyzing an optical signal from the surface. The strength of the optical signal determines the quality of the optical image. Therefore, a weak optical signal will generate an image which is inferior to an image generated by a stronger optical signal. The light losses associated with a particular imaging technique, or an apparatus used to practice such a technique, affect the strength of the optical signal used to generate the image. The greater the light loss, the weaker the optical signal.

For example, in a luminescence imaging system, the source light is absorbed by the surface being imaged, the photoexcited surface emits luminescence and reflected light, and the emitted light is then imaged. Therefore, the emitted light must be a collectible signal for it to be used to generate an image. The near-field luminescence technique utilizes a probe with a sub-wavelength sized aperture. The intrinsic loss of photons is on the order of $1 \times 10^5$ in a fiber probe with an aperture size on the order of $1/10$ of a wavelength. Although the light losses associated with aperture size are reduced by increasing the aperture size, an increase in aperture size will decrease the resolution of the resulting image. The near-field luminescence technique also probes in a very small spot size, which also causes a loss of photons. For spatial resolution on the order of 1/10 wavelength, the penalty is on the order of $1 \times 10^2$ compared to diffraction limited imaging.

The conversion of the source light to collectible luminescence also results in the intrinsic loss of the source light. These losses are on the order of $1 \times 10^5$ to $1 \times 10^7$ in luminescent imaging systems. Shadows cast by the probe in the near-field luminescence technique also reduce the signal level. A near-field apparatus which reduces the photon losses associated with the near-field spectroscopic imaging techniques without a commensurate increase in the aperture size of the probe is therefore desired.

SUMMARY OF THE INVENTION

An apparatus for the spectroscopic imaging of a sample is disclosed. The apparatus operates at low temperature to reduce the light losses associated with the spectroscopic imaging technique. The apparatus is equipped with a near-field microscope that is adapted to operate in a low temperature environment, e.g., about 1.5 K. to about 300 K. It is advantageous if the low-temperature environment is provided by introducing a pumped helium atmosphere into a housing containing the sample to be imaged.

An example of a near-field scanning optical microscope is described in Betzig, E., et al. "Combined shear force and near-field scanning optical microscopy," *Appl. Phys. Lett.*, 60(20): 2484 (1992) and Betzig, E., and Trautman, K., "Near-field Optics: Microscopy, Spectroscopy, and Surface Modification Beyond the Diffraction Limit," *Science.* 257:189 (1992), which are hereby incorporated by reference. The apparatus includes a fine probe which has a longitudinal axis and a tip. The apparatus also has a positioner, adapted to operate in a low temperature environment, that moves the probe tip relative to the surface of a sample which is being examined by the probe tip. It is advantageous if the positioner places the probe tip within the near-field distance from the sample surface. It is advantageous if the positioner that places the probe tip within the near-field distance, i.e., a distance that is less than the requisite spatial resolution, of the sample surface is controlled by optically imaging the probe tip onto a photodetector in order to detect changes in the oscillation of the probe tip.

The apparatus also displaces the probe tip relative to the surface. The apparatus is adapted to displace the probe tip relative to the surface in a low temperature environment. The relative tip displacement includes a scan pattern, such as a raster scan, which lies substantially in a plane, referred to herein as the "scanning plane". The scanning plane lies substantially parallel to the surface portion which is scanned. The apparatus oscillates the probe tip relative to the surface. The position of the probe tip relative to the sample surface is controlled by observing the change in the probe tip oscillation as the probe tip approaches the sample surface.

The apparatus is provided with imaging optics that image a sample. This includes an energy source that introduces light onto the sample surface and a collector for the light emitted from the sample surface. Depending upon the spectroscopic imaging technique used, the probe is used either to transmit light onto the sample, or to collect light emitted from the sample. The imaging optics further comprise far-field optics that work in cooperation with the near-field probe (e.g., if the probe transmits light to the sample surface, the far-field optics collect the light emitted from that surface and vice-versa), a spectrometer for dispersing light from the light-collecting optics, and a detector for recording light dispersed by the spectrometer.

The apparatus optically inspects a sample in a low-temperature environment. A cryostat provides such an environment. The sample and probe and the associated apparatus for moving the sample and probe are contained in the cryostat. The far-field optics and the associated apparatus or moving the sample and probe are also contained in the cryostat. The cryostat is adapted to receive the sample. A pumped helium atmosphere that is either gaseous or liquid helium is introduced into the cryostat to provide the desired low temperature environment. One skilled in the art will appreciate that there are many other mechanisms by which a low temperature environment is provided, however. For example, the pumped or liquid helium is circulated in the cryostat walls to cool the cryostat interior.

DETAILED DESCRIPTION

The apparatus interrogates the optical characteristics of the sample by near-field imaging in a low-temperature environment. The near-field imaging apparatus is adapted to perform its desired function in a low temperature environment. It is advantageous if the low temperature environment is about 1.5 K. to about 300 K. Examples of objects that are imaged by the apparatus include objects such as semiconductors, molecules, and polymers.

One embodiment of the present invention is described herein. One skilled in the art will recognize that there are many equivalent substructures that will perform the functions of the specific substructures in the described embodiment. The present invention is therefore not to be construed as limited to those substructures that are specifically described. Furthermore, the present invention is adapted to image surfaces using a variety of spectroscopic techniques such as luminescence, reflectance, absorption, transmission, photoconductivity and Raman scattering. The specific embodiment described is adapted to spectroscopically image a semiconductor surface using near-field luminescence. One skilled in the art will appreciate how to adapt the apparatus of the present invention to perform other spectroscopic imaging techniques based on this description.

The embodiment specifically described is adapted to detect optical properties of a sample surface. The optical properties of a sample surface are utilized to determine many different aspects of the surface being scanned. For example, if the scanned sample is a semiconductor, the optical properties are used to determine film thickness, feature size, surface composition and other aspects of the semiconductor surface well known to one skilled in the art.

Figure 1:
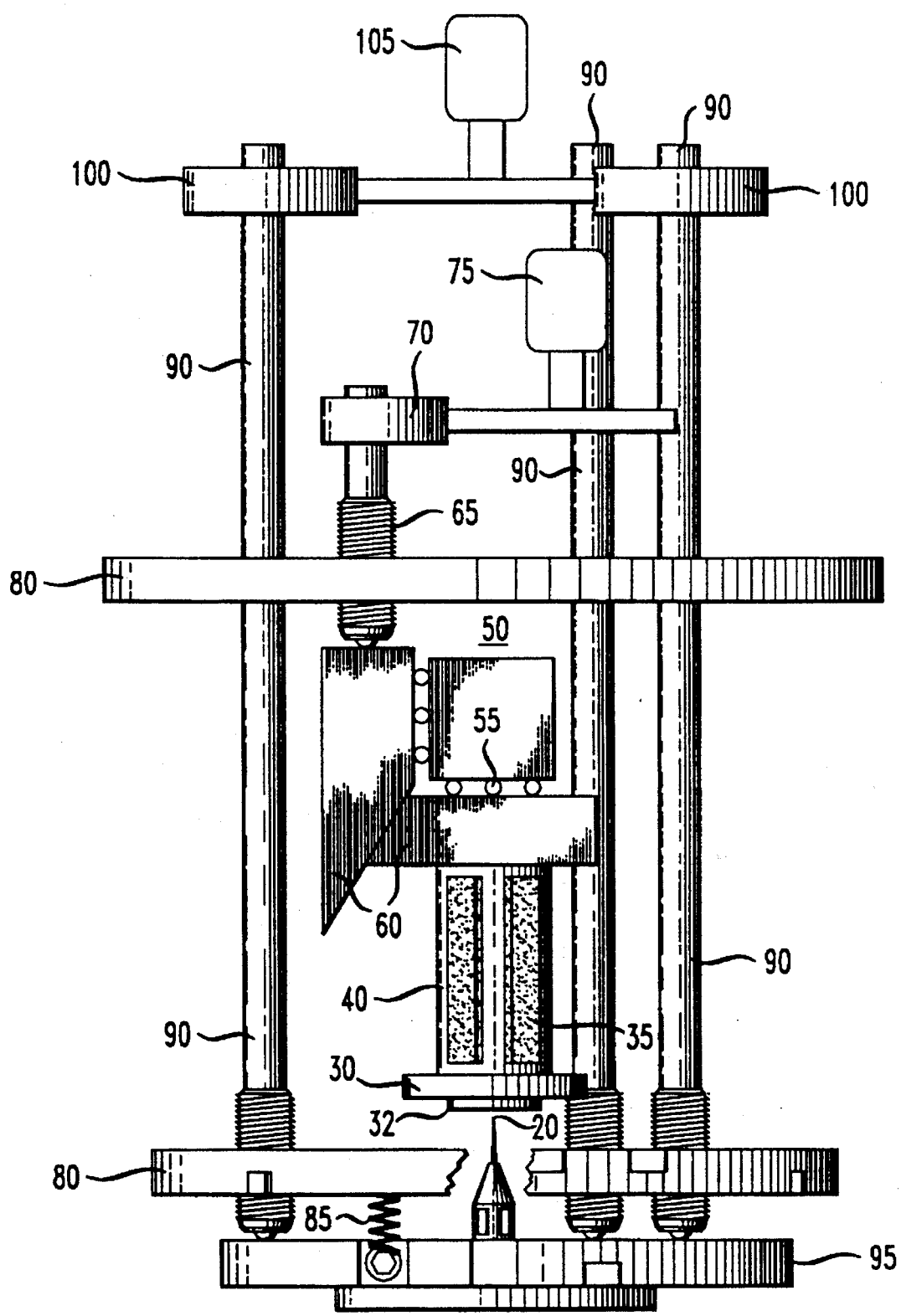
FIG. 1 is a schematic drawing of a portion of the motion system of the apparatus of the present invention.

A schematic of the internal mechanism contained in the cryostat (not pictured) is depicted in FIG. 1. Although not specifically depicted, one skilled in the art will appreciate how to fix the internal mechanism in the cryostat interior. The internal mechanism includes a motion system for precisely positioning a sample 32 relative to the probe 20 at temperatures of about 1.5 K. to 300 K. The sample 32 is mounted on a platform 30. The platform 30 is attached to the top of a piezoelectric scan tube 40. Since the piezo tube is subjected to high voltage, it is advantageous if the sample is not in direct contact with the piezoelectric scan tube. It is advantageous if the piezo scan tube 40 is made of PZT 8, which is suited for low temperature applications. PZT 8 is commercially obtained from Morgon Matroc, Inc., Vernitron Division, of Bedford, Ohio. Other piezo materials are known to those skilled in the art. It is advantageous if the platform 30 is made of a material, such as titanium, that matches the low temperature thermal expansion coefficient of piezoelectric ceramics.

In a specific embodiment of the invention described herein, the piezo scan tube is one inch long with a 0.25 inch diameter and a 0.02 inch wall thickness. The piezo scan tube moves the platform 30 in three dimensions. The outer electrode, which is the metal coating 35 on the outside of the tube, is quartered to move the piezo tube in two dimensions. An inner electrode (not pictured) is provided to move the piezo tube in the third dimension. It is the controlled application of a voltage difference between the electrodes that causes the piezo scan tube 40 to move. The mechanisms for using piezo materials for motion control are known to those skilled in the art. The bottom of the piezo scan tube 40 is fixed to a translation stage 50.

It is advantageous if the platform 30 is equipped with a temperature sensor. For example, the platform 30 is equipped with a thermometer (e.g., a silicon diode thermometer (DT-470) from Lakeshore Cryotonics of Westerville, Ohio) (not shown) and 30 Ohms of Manganin heater wire (not shown). The thermometer and heater wire permit active control of the temperature in the cryostat.

The translation stage 50 is assembled in a manner that permits its macroscopic movement in the x-y plane of the sample surface in a cryogenic environment. In this regard, the bearings 55 used to move the translation stage in the linear direction are adapted to operate in a cryogenic environment. One example of suitable bearings is Schneeburger Type "R" bearings that are obtained from Schneeburger of Bedford, Mass. Two sliding plates 60, each with wedged edges are employed to provide the desired movement. The angle of the wedge edges in the illustrated embodiment is about two to one. The vertical movement is provided by a screw mechanism 65. The screw 65 used in the illustrated embodiment is a ¼ inch, 80 thread-per-inch screw.

The screw 65 is driven by a stepper motor 75 via transmission gears 70. It is advantageous if the stepper motor operates in a cryogenic environment, i.e., at temperatures of about 1.5 K. to about 300 K. One example of a suitable stepper motor is a Princeton Research Instruments (located in Princeton, N.J.) Size A In-Vacuum Stepper Motor 75. All of the moving parts in the cryostat were coated with a low temperature lubricant to permit precise motion control in the low temperature environment. One example of a low temperature lubricant is tungsten disulfide.

The internal positioning mechanism places probe 20 within the near-field region of the sample 32 surface. In the illustrated embodiment, the probe 20 is mounted on a platform 95. The platform 95 is spring loaded 85 onto three drive screws 90 placed symmetrically in a circle. The drive screws 90 are driven by transmission gears 100 which are, in turn, driven by a stepper motor 105. One example of a suitable stepper motor is a Princeton Research Instruments Size B In-Vacuum Stepper Motor. Again, the internal screws and gears were coated with a low temperature lubricant such as tungsten disulfide to allow acceptable motion control at low temperature.

It is also advantageous if the cryostat and associated apparatus are insulated from external vibrations. In this regard, it is contemplated that the apparatus will be erected on a stable surface that is isolated from external vibrations, e.g., a floating table, and that vibrations from external equipment such as pump lines will be reduced. One skilled in the art will be familiar with ways to accomplish this objective.

The screws 65 and 90 pass through plates 80, which act as guides for the screws. Furthermore, a series of screws (and their associated rods) and plates (not pictured) are used to support the mechanism depicted in FIG. 1 in the cryostat. One skilled in the art will appreciate that there are many different mechanisms by which the apparatus illustrated in FIG. 1 is fixed in a cryostat.

The low temperature environment is introduced into the cryostat 235 (FIG. 2) by conventional means known to one skilled in the art. A reservoir of liquid or gaseous helium is provided (not shown). A pressure differential is introduced which causes the liquid or gaseous helium to flow into the cryostat. The flow of the liquid or gaseous helium is controlled by a needle valve. The low temperature environment is also provided by circulating the liquid or gaseous helium in the walls of the cryostat and by evacuating the cryostat chamber. The circulating low-temperature helium reduces the temperature in the cryostat chamber to the desired level.

Figure 2:
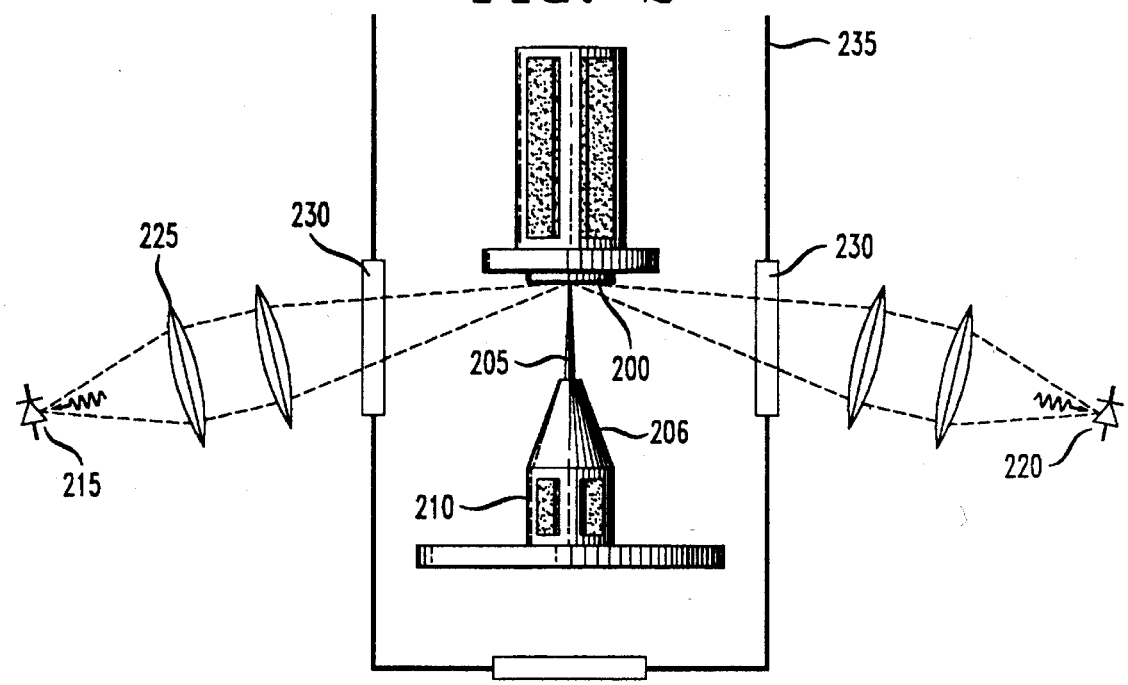
FIG. 2 is a schematic illustration,of the shear-force feedback mechanism used by the present invention to place the probe within the near-field distance of the sample surface.

The apparatus utilizes the shear-force technique to control the position of the probe 20 relative to the sample 32. Such a technique is described in detail in the Betzig et al. articles previously mentioned and incorporated by reference into this disclosure. For clarity, a general description of the technique as it relates to the operation of the claimed apparatus is provided herein, although all of the nuances of the technique are not described. Referring to FIG. 2, the technique is used to bring the probe 205 within the near-field distance of a sample 200. The fiber probe 205 is mounted on a chuck 206 which, in turn, is attached to a small piezo tube 210. Examples of suitable probes are described in Betzig, E., et al. "Breaking the Diffraction Barrier: Optical Microscopy on a Nanometric Scale," *Science,* 251:1468 (1991) which is incorporated by reference herein. The piezo tube in the illustrated embodiment is similar to the piezo tube 40 previously described hereinabove, except it is smaller. The probe 205 is made to dither or sway laterally by driving the piezo with a small sinusoidal voltage. The probe dither is controlled by a generator (not shown) such as a Stanford Research Systems (located in Sunnyvale, Calif.) Model DS345 Function Generator. There is an approximately linear relationship between the voltage applied to the piezo and piezo motion. Since the movement of the probe tip 205 is an amplification of the movement of the piezo 210, the movement of the tip 205 is controlled by the voltage applied to the piezo 210.

It is advantageous if the frequency of the sinusoid is in resonance with the vibrational mode of the fiber probe. The resonant frequency for a particular probe depends upon its length and its shape. Such resonances are typically between 10 kHz and 100 kHz with line widths on the order of 100 Hz. The amplitude of the motion is measured by scattering the light off of the probe. The apparatus is equipped with a light source 215 and a light detector 220 for this purpose.

One example of a light source 215 is a 980 nm diode laser with a maximum output power of 10 mW. Such a laser is obtained commercially from Applied Electronics of South Plainfield, N.J. The light source 215 is driven with a low noise current source, an example of which is an ILX Lightwave LDX-3620 Ultra Low Noise Current Source which is obtained from ILX Lightwave of Boseman, Mont.

The light source 215 is imaged on the tip of the probe. In one embodiment, a pair of 100 mm focal length lenses 225 are used for this purpose. PAC 052 lenses from Newport Corp. of Fountain Valley, Calif. are examples of suitable lenses. The light signal is transmitted through a window 230 in the cryostat 235. The window 230 is made of a light-transmissive material with an acceptable coefficient of thermal expansion for cryogenic applications. Examples of suitable materials include silica, borosilicate glass, and sapphire. At least a portion of the light signal is incident on the probe 205. Light reflected from the sample 200 is transmitted through a second window 230 in the cryostat 235, through another pair of 100 mm focal lenses 225, and onto the detector 220. One example of a suitable detector 220 is a silicon photodiode such as a PIN 5D from UDT Sensors Inc. of Hawthorne, Calif. Such a detector has a responsivity of 0.5 A/W. In the embodiment presently described, the detector is operated in the photovoltaic mode using an amplifier such as, for example, an OPA 101 operational amplifier obtained from Burr Brown Corp. of Tuscon, Ariz.

How the signal received by the detector is processed is largely a matter of design choice. In the embodiment described herein, the output from the detector 220 is split and sent to a divider integrated circuit. One example of a suitable divider integrated circuit is an AD534 obtained from Analog Devices of Norwood, Calif. In the presently described embodiment, the input to the numerator is unprocessed while the input to the denominator is low passed using a 10 kHz RC filter. Signal input in this manner reduces low frequency noise such as vibrations and laser drift by the factor $v/v_o$ where v is the noise frequency and $v_o$ is 10 kHz. In the described embodiment, the output of the divider is input to a lock-in amplifier, an example of which is a PAR 5210 from EG&G, and demodulated at the dither frequency. The in-quadrature component of the demodulated signal, which senses dither amplitude, is input to an integrating feedback circuit which regulates the distance between the probe tip 205 and the sample 200. During the operation of the described embodiment of the present invention, the integration time constant does not exceed 10 ms and the resulting height fluctuation is less than 25 Å. A height fluctuation that is less than or equal to about 100 Å is necessary for reliable operation of the detector. The height fluctuation provided by the apparatus is therefore within the desired range. By observing the frequency of the dither amplitude, one can determine when the probe 205 is within the near-field distance of the sample 200.

Figure 3:
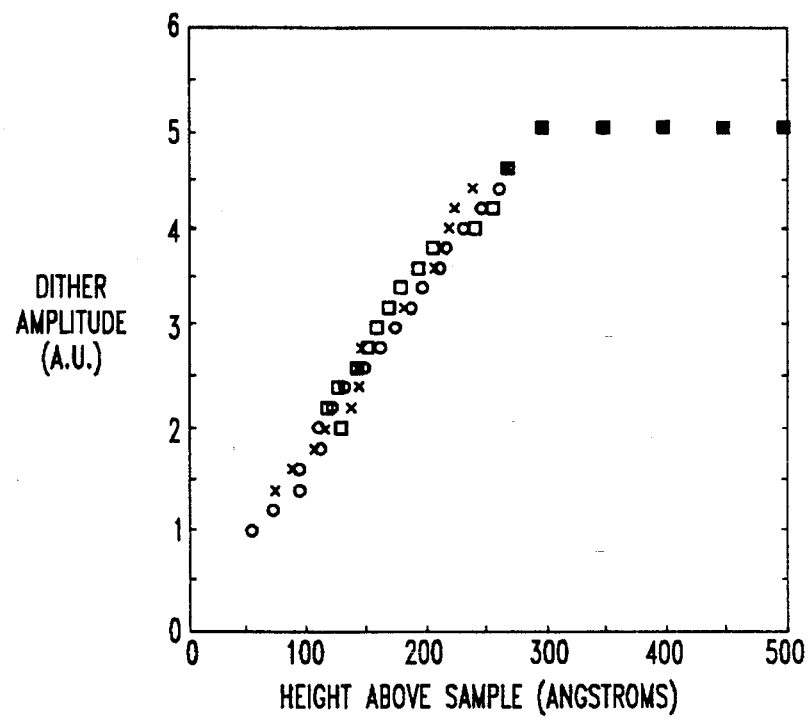
FIG. 3 is a shear-force response curve obtained with the sample and probe of the apparatus immersed in 1.5 K. superfluid liquid helium.

Example 1: Placing the Probe Within the Near-Field Distance Using the: Apparatus of the Present Invention The shear-force response curve was obtained using the above-described apparatus and is illustrated in FIG. 3. The response curve was obtained with the probe tip 205 (FIG. 2) and sample 200 (FIG. 2) immersed in superfluid liquid helium at a temperature of 1.5 K. in a cryostat. The moving parts of the apparatus in the cryogenic environment were coated with a low temperature lubricant by Dicronite, Inc. of Westfield, Mass. The probe was cycled away from and close to the sample several times to obtain the curve illustrated in FIG. 3. Each cycle is represented by a different symbol. This indicates that reproducible results were obtained with this apparatus. FIG. 3 illustrates that the dither amplitude of the probe decreased when the probe was brought within 300 Å of the sample surface and continued to decrease as the sample was brought closer to the probe. This illustrates that the apparatus was able to detect a reduction in the dither amplitude of the probe and was further able to utilize this detection to place the probe within the near-field distance of the sample surface.

The probe is equipped with an aperture through which light is either emitted or collected. The spatial resolution of the image obtained by the probe is related to the size of the probe aperture. Since the amplitude of the dither motion is significantly less than the aperture size in this technique, the apparatus is operated using a dither amplitude in which a change in the drive voltage will not effect the spatial resolution of the image. It is advantageous if the dither amplitude is one-third or less of the resolution. For example, if the spatial resolution is about 1000 Å, then the dither amplitude will be about 300 Å or less.

Figure 4:
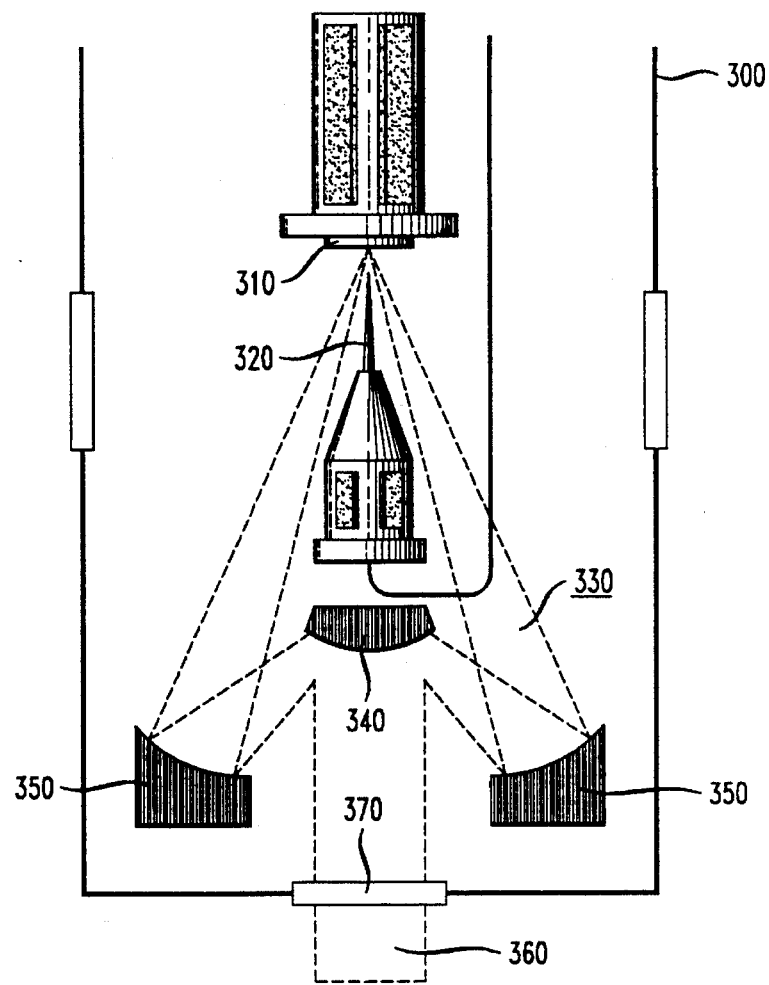
FIG. 4 is a schematic of the optical imaging system in the present invention.

Referring to FIG. 4, once the probe 320 is positioned within the near-field distance of the sample 310, the apparatus is used to optically interrogate the sample. Generally, the apparatus provides a means for transmitting light onto the sample and a means for collecting the reflected or luminescent light emitted from the sample. Far-field optics 330 which are compatible with the low temperature environment are used to either introduce the light source onto the sample or to collect the light emitted from the sample in cooperation with the probe. If the apparatus is used for spectroscopic luminescence and the far-field optics 330 are used to focus the light onto the sample and the probe collects the light emitted from the sample, the apparatus is operated in the near-field collection mode. Conversely, if the probe is used to photoexcite or otherwise transmit light onto the sample and the luminescence is collected by far-field optics, the apparatus is operated in the near-field illumination mode. The apparatus of the present invention is adapted to operate in either the near-field collection mode or the near-field illumination mode.

The optical system in the cryostat 300 is illustrated schematically in FIG. 4. The optical system is designed for performing spectroscopy on a sample in a low temperature environment of about 1.5 K. to about 300 K. The optical system operates in both the near-field collection mode (the sample 310 is photoexcited by a light source focused onto the sample by conventional far-field optics 330 and the probe 320 collects the resulting luminescence) and in the near-field luminescence mode (the probe 320 is used to photoexcite the sample 310 and the luminescence is collected by far-field optics 330).

The probe 320 is positioned on the optical axis of an objective 330. Although many conventional optics are contemplated as suitable, one example of a suitable objective 330 is a Schwarzchild 25 X reflecting microscope objective obtained from Ealing Electro-Optics of Holliston, Mass. The Schwarzchild 25 X objective is non-dispersive, has a large numerical aperture, i.e., 0.4 in the present embodiment, and has a working distance of 1.5 cm.

It is advantageous if the objective 330 is placed within the cryostat 300 and subjected to the low temperature environment provided therein. Not only must the objective be made of materials that will withstand the low temperature environment, the mechanism used to focus the objective must also operate at low temperature. The objective 330 has a small primary convex mirror 340 and a larger, secondary concave mirror 350. The mirrors 340 and 350 are mounted on plates (not shown) which are moved vertically to focus and collimate a beam of light either on the sample 310 or out window 370 to external apparatus. The movement of the objective 330 is controlled using a 3-screw linear motion mechanism similar to the one used to control the movement of the probe platform that was previously described. The linear motion mechanism is adapted to operate in a low temperature environment as previously described, i.e., the gears and screws of the mechanism are coated with a low temperature lubricant. This mechanism is not specifically illustrated in FIG. 4.

As illustrated in FIG. 4, the probe 320 is interposed between the far-field objective 330 and the sample 310. Therefore, the field of view of the objective 330 is somewhat obscured by the probe 310. The Schwarzchild objective is advantageous because its configuration somewhat overcomes the obscured field of view. By using the Schwarzchild objective, the field of view in the embodiment illustrated in FIG. 4 is obscured about 20%.

Figure 5:
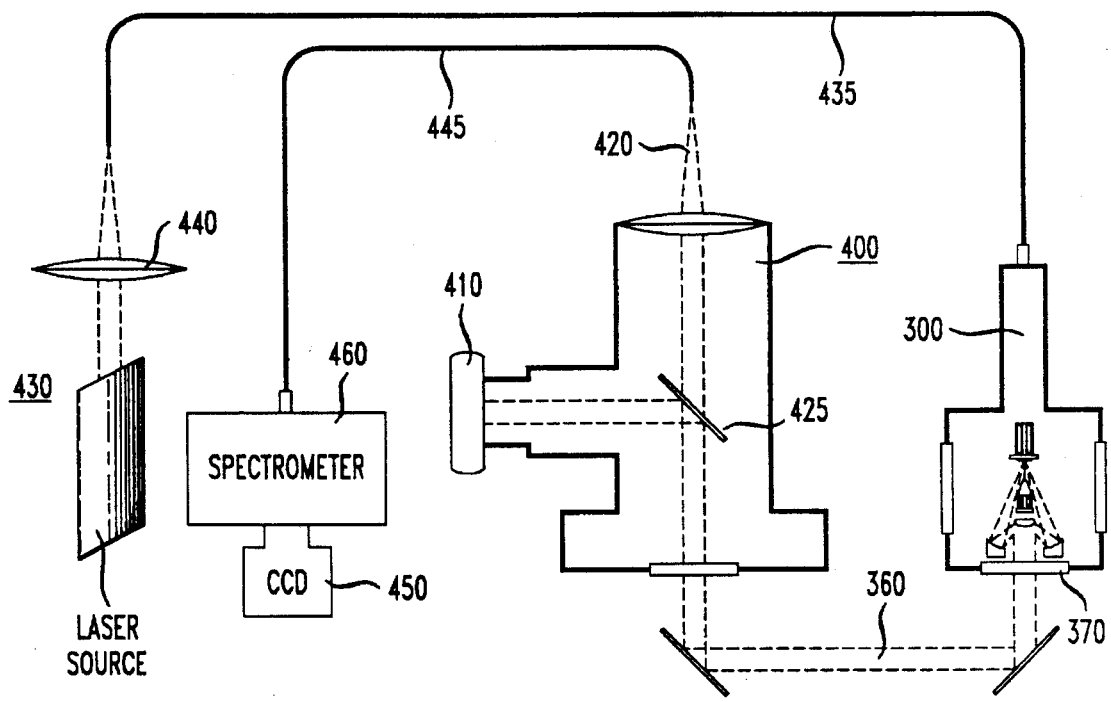
FIG. 5 is a schematic of the input/output optics of the apparatus of the present invention associated with spectroscopic optics for optically imaging a sample in the near-field illumination mode.

In FIG. 5, the cryostat 300 is depicted as optically connected to external apparatus. FIG. 5 is a schematic illustration of the apparatus as used to perform the spectroscopic luminescence technique previously described in the near-field illumination mode. The external apparatus illustrated in FIG. 5 are used generally to provide a light source for imaging of the sample and to perform spectroscopic analysis of the optical signal emitted by the sample. The external apparatus includes an excitation source 430, an optical microscope 400, a spectrometer 460, and a charge coupled device camera 450. One example of an external excitation source 430 is a continuous wave Titanium:Sapphire laser obtained from the Lexel Laser Corp. of Palo Alto, Calif. Light from the excitation source 430 is transmitted to the probe 320 (FIG. 4) via an optical fiber 435. Up to 2 mW of laser power are used to feed light to the probe from the laser under these conditions.

An example of an optical microscope 400 is a Zeiss Axioscope obtained from Carl Zeiss, Inc., of Thornwood, N.Y. As illustrated in FIG. 4, the objective, if the apparatus is operated in the near-field illumination mode, transmits a signal 360 through a cryostat window 370 to the external apparatus for analyzing the optical signal. As illustrated in FIG. 5, that signal, a collimated beam, is transmitted through the barrel of an optical microscope 400. The optical microscope is equipped with an eyepiece 410 and a fiber optic coupler 420. The signal is either viewed through the eyepiece 410 or by instruments downstream of the coupler 420, depending upon where the microscope 410 directs the signal. The microscope controls the direction of the signal using either a mirror (not shown) or a beam splitter 425. The beam splitter directs the signal to the eyepiece 410 and the coupler 420.

Far-field light is coupled from the objective 330 (FIG. 4) through this coupler 420. When the apparatus is operated in the near-field illumination mode, a 50 micron core multimode fiber is attached to this coupler 420. The fiber optic coupler 420 transmits the optical signal from the optical microscope 400 to an optical fiber 445 which, in turn, transmits the optical signal to the spectrometer 460 and detector 450.

A liquid nitrogen cooled, silicon, charge coupled device camera containing a Tektronics 512×512 chip that is packaged and sold by Princeton Instruments of Trenton, N.J., is an example of a suitable detector 450. This detector 450 has a read noise of 8 electrons/pixel, a dark count of 1 electron/hour/pixel and a quantum efficiency of sixty percent. The detector 450 in the illustrated embodiment is mounted in the imaging plane of a spectrometer 460, an example of which is as a SPEX#1877, 0.6 meter triple spectrometer which is obtained from Spex Industries of Edison, N.J. The optical signals are first dispersed by the spectrometer 460 and then recorded by the detector 450. A spectroscopic image of the same is generated by the signals recorded by the detector. One skilled in the art will appreciate how such images are generated.

FIG. 5, with slight modification, also depicts the operation of the apparatus in the near-field collection mode. When the cryostat and associated apparatus are operated in the near-field collection mode, as much as 20 mW are focused from the laser excitation source through the Schwarzchild objective and onto sample. To operate the apparatus depicted in FIG. 5 in the near-field collection mode, the fiber 445 is decoupled from the spectrometer 460 and the fiber 435 is decoupled from the laser excitation source 430. Then, the fiber 445 is replaced with a single-mode fiber which is then coupled to the laser excitation source 430 and the fiber 435 is coupled to the spectrometer 460. In the near-field collection mode, the optical signal is transmitted from the laser source 430 through fiber 445 through the optical microscope 400 to the far-field optics in the cryostat 300. The far-field optics focus the light onto the sample. The light emitted from the sample is then collected by the probe and transmitted through fiber 435 and associated apparatus for generating an optical image of the sample.

Example 2: Imaging Using the Apparatus of the Present Invention

The apparatus of the present invention was configured for use in conjunction with conventional scan electronics to generate images. The scan electronics raster scanned the large tube piezo which positioned the sample relative to the probe. The scan electronics were synchronized with the detector to generate images of spectral features as a function of probe position. The exposure time was set equal to the pixel acquisition time of the scan electronics. One-second exposures were used although one skilled in the art will recognize that exposure time is largely a matter of design choice. When the exposure was completed, the probe was advanced to the next pixel. The size of a pixel in the present context is the distance through which the probe moves during the pixel acquisition time.

The apparatus reduces the intrinsic photon loss in spectroscopy of semiconductors. Because the sample is probed at a temperature of about 1.5 K. to about 300 K., the signal loss is less than the signal loss if such a sample were probed in a higher temperature environment.

We claim:

1. An apparatus for scanning at least a portion of the surface of a sample in a low temperature environment comprising:

a housing, a temperature controller that creates and maintains a temperature of about 1.5 K. to about 300 K. in the housing and, within the housing, a probe having a longitudinal axis and a tip, a positioner that positions the probe tip within a distance of one wavelength of light or less from a surface of the sample, and an oscillator that displaces the probe tip relative to the surface;

a photodetector; and a positioner controller that controls the position of the probe relative to the surface of the sample by imaging the probe tip onto the photodetector such that the changes in the oscillation of the probe tip are detectable by the photodetector.

2. The apparatus of claim 1 wherein the housing equipped with a temperature controller is a cryostat.

3. The apparatus of claim 2 wherein the low-temperature is provided by a pumped helium atmosphere selected from the group consisting of gaseous helium and liquid helium that is introduced into the housing.

4. The apparatus of claim 1 wherein the apparatus further comprises a light source and a light collector for optically imaging the sample.

5. The apparatus of claim 4 wherein the light source transmits light onto the sample and the light collector collects the light emitted from the sample.

6. The apparatus of claim 5 further comprising far field optics within the housing, wherein the far field optics are positioned to transmit a light signal to the surface of the sample and to receive a light signal emitted from the surface of the sample.

7. The apparatus of claim 6 wherein the apparatus further comprises an optical microscope for observing the light from the light collector, a spectrometer that disperses the light from the light collecting means and a detector for recording light dispersed by the spectrometer means.

8. The apparatus of claim 7 wherein the probe transmits the light onto the sample and the far field optics collect the light emitted from the sample.

9. The apparatus of claim 7 wherein the far field optics transmit the light onto the sample and the probe collects the light emitted from the sample.

10. The apparatus of claim 6 wherein the light source further comprises an excitation source.

11. The apparatus of claim 6 wherein the far-field optics are a non-dispersive means for focusing and collimating a beam of light.

12. The apparatus of claim 1 wherein the positioner comprises a first platform to which the sample is fixed, a second platform to which the probe is fixed and a mechanism for moving the platforms in the housing at a temperature of about 1.5 K. to about 300 K.

13. The apparatus of claim 6 further comprising a mechanism for focusing the far-field optics at a temperature of about 1.5 K. to about 300 K.

* * * * *